Figure 11:
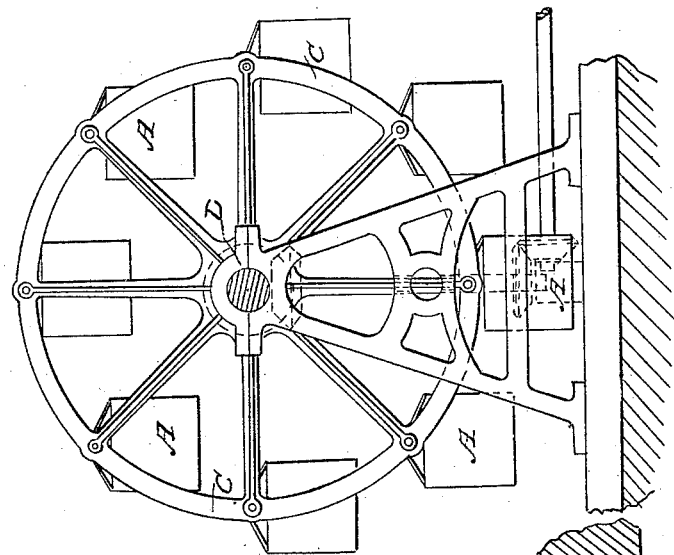
Figure 11:
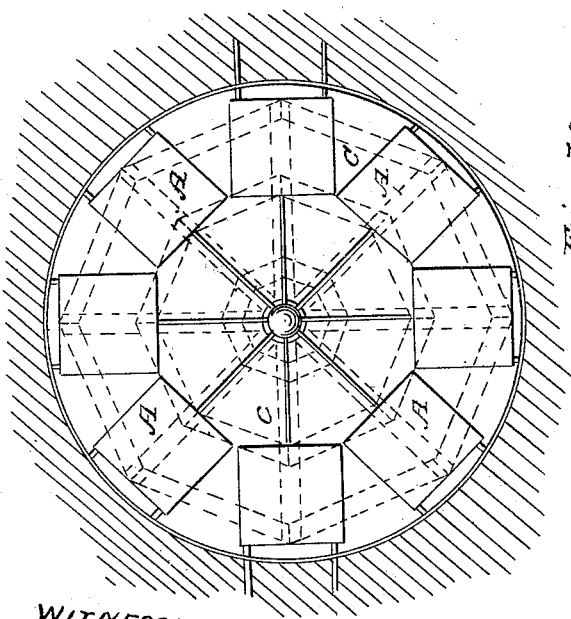

KELLER & HENDERSON.
Ice Machine.
No. 49,887.
3 Sheets—Sheet 1.
Patented Sept. 12 1865.
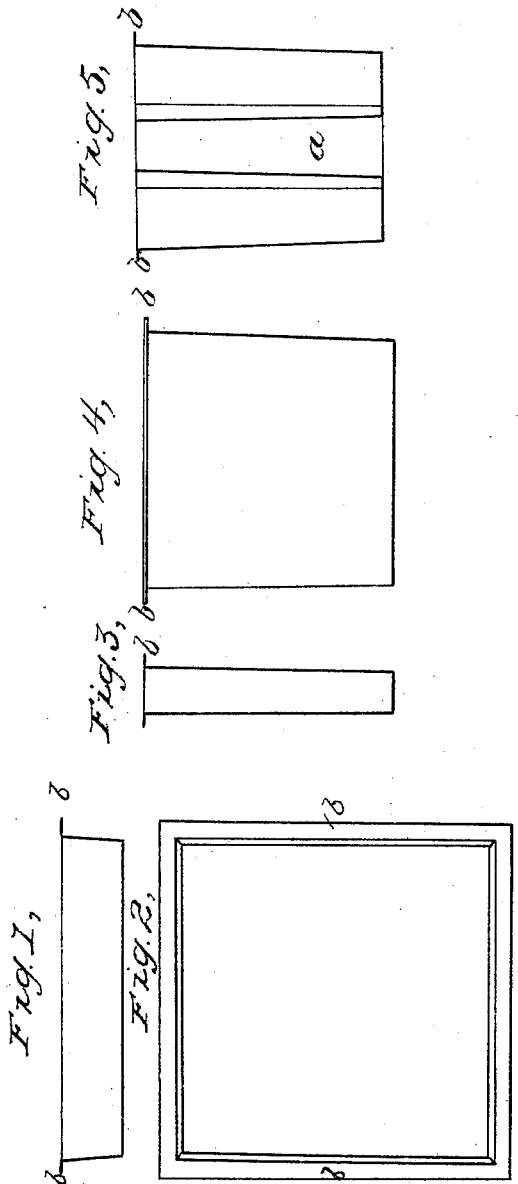
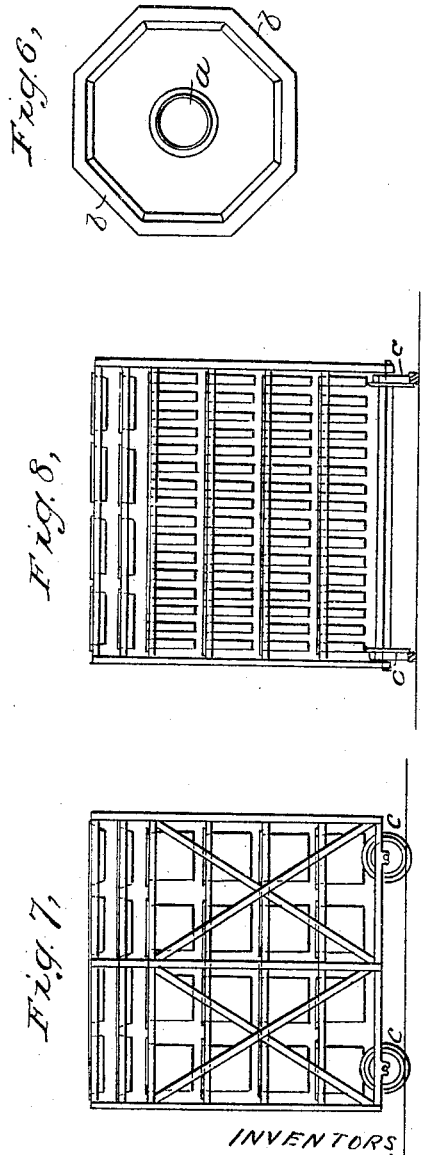

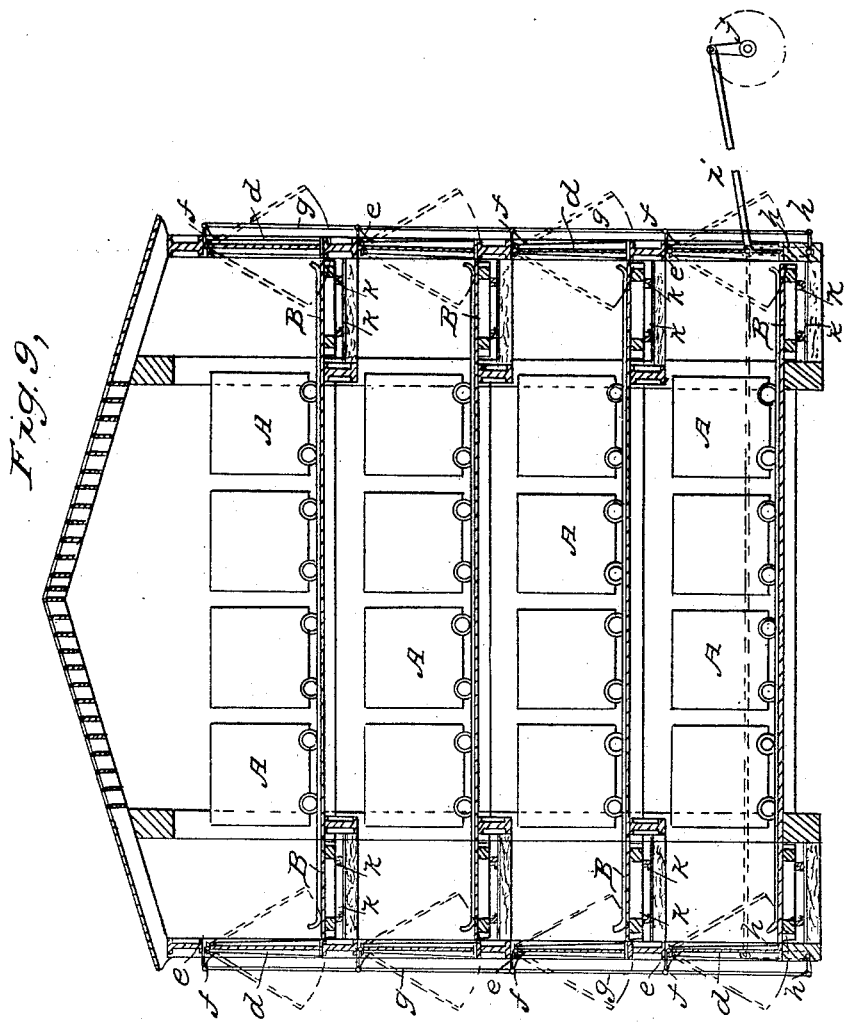

KELLER & HENDERSON.
Ice Machine.

3 Sheets—Sheet 3.

No. 49,887.

Patented Sept. 12 1865.

WITNESSES:

INVENTORS

UNITED STATES PATENT OFFICE.

CHARLES M. KELLER, OF NEW YORK, AND JAMES HENDERSON, OF BROOKLYN, N. Y.

IMPROVEMENT IN THE MANUFACTURE OF ICE.

Specification forming part of Letters Patent No. 49,887, dated September 12, 1865.

*To all whom it may concern:*

Be it known that we, CHARLES M. KELLER, of the city, county, and State of New York, and JAMES HENDERSON, of Brooklyn, Kings county, and State of New York, have invented certain new and useful Improvements in Refrigerating or Freezing Liquids to Produce Blocks of Ice; and we do hereby declare that the following is a full, clear, and exact description thereof, reference being had to the accompanying drawings, making part of this specification.

The object of our said invention is to obtain solid blocks of ice of a size and form suitable for transportation, packing, and sale without the necessity of cutting or breaking, and freezing such blocks in much less time or by temperatures which would fail to produce ice of sufficient thickness on lakes, ponds, or rivers; and this object we effect by our said invention, which consists in exposing the water to be frozen in a series of pans made of some good conductor of caloric, thin and of the form of the required blocks of ice, and suspended by their rims so as to expose their outer surfaces to the action of the atmosphere; and we aid the said operation by the second part of our said invention, which consists in combining with the series of freezing-pans means for causing a more energetic action of air around and by the said pans, either by causing the frames in which the pans are suspended to be moved through the air, or, as the equivalent thereof, causing currents of air to circulate around and by the said pans, such increased action having the effect of more rapidly conducting the caloric out of the pans, and thereby inducing a more rapid freezing of the contained water.

In the accompanying drawings we have shown different views of vessels of various forms which we propose to use for the purposes of our said invention, and also the manner in which we cause the air to act energetically on the radiating-surfaces of the vessels.

Figure 1 is a sectional view, and Fig. 2 a plan view, of a square shallow vessel, which is the form we prefer when the vessels are to remain stationary while the freezing operation is going on. Fig. 3 is a sectional view, and Fig. 4 an external side view, of another form of vessel, which is deep but narrow, and is more applicable than the shallow vessel when the freezing-vessels are to be put in motion. Fig. 5 is a sectional view, and Fig. 6 a plan view, of a third form, which in this instance is octagonal, and is provided with a central opening, *a*, up which the air may circulate for the purpose of carrying off the caloric which radiates from the exposed inner sides of the vessel. In all these cases the sides are inclined, so as to facilitate the removal of the ice from the vessels, and all are provided with projecting flanges *b b*, whereby they may be suspended in suitable frames, so that the air may have free access to the entire outer surface.

A number of metallic vessels of either of these kinds, having been filled with water, are arranged in rows on frames or racks of several stories, made of iron or other materials, and suspended by their rims *b b* and exposed to the action of the air during frosty weather. The cold of the atmosphere, by acting on the metallic surfaces, will abstract the heat therefrom and will freeze the water in the vessels into solid blocks.

Between all the vessels, intervening spaces must be allowed to enable the vessels to be taken out and to form a passage for the air, and the frames can be arranged to form a shallow vat for each story, in which the water may be made to flow from a cock at one end, for the purpose of filling the pans or vessels, or they may be made separately in any other manner.

The frames may be made either of wood or iron, and they may be stationary or movable. Iron racks are preferable for holding the vessels, and the frames may be mounted on casters, so as to admit of their being moved about with facility and placed in the direction of the current of air, in order to receive the full effect of it. The frames may also be constructed so as to be taken apart and stored away when not in use. Fig. 7 is a side elevation, and Fig. 8 an end elevation, of one of these wrought-iron frames, with a number of the freezing-vessels—such as those shown in Figs. 1 and 3—suspended therein for the purpose of freezing or cooling water. These frames are mounted on casters or wheels $c\ c$, which are flanged so as to run upon rails, as shown in the drawings.

It will be evident that whenever the atmosphere is sufficiently cold to freeze water under ordinary circumstances of a slight thickness only it will be sufficient to freeze the water in the metallic pans or vessels into solid blocks, as the air has free access to the bottom and sides of the vessels, their external sides being so constructed and prepared as to radiate the heat as freely as possible. When the freezing has been effected the blocks are to be removed from the vessels, which can then be refilled and the refrigerating or freezing process repeated for as long a time as the frost lasts. The ice thus produced can be stored in ice-houses until required for use, the form of the blocks being suited thereto.

The freezing operation will be facilitated, especially when the air is calm and quiet, by causing an artificial current of cold air to play upon the exposed surfaces of the metallic vessels. This artificial current of air may be produced either by means of a rotating fan or other blowing apparatus, or by constructing the sides of the building in which the freezing-vessels are placed with movable lower boarding, which is mounted in frames so that an opening and closing action may be communicated to the boards in order to create a draft through the building. This arrangement is shown in Fig. 9, which is a vertical section of a building provided with these movable lower boards, $d\ d\ d\ d$.

The frames to hold the refrigerating-vessels are shown at A A A A, and are arranged in tiers one above the other. They are placed on rails, so that they may run in and out of the building when required. When there is sufficient wind the lower boards, $d\ d$, are kept permanently open, as indicated by dotted lines in the figures, as there will then be no occasion to keep them in motion. The lower boards are suspended from centers or rocking shafts $e\ e$, which carry the arms or levers $f\ f$. These latter are connected by a rod, $g$, to one end of a bell-crank lever, $h$, the opposite end of which is connected by a rod, $i$, to a crank, $j$, which is actuated in any convenient manner, and thereby communicates a to-and-fro motion to the lower boards, as indicated by the dotted lines. The lower boards may, however, be actuated in any other convenient manner to produce the requisite artificial current. When the water in the vessels is frozen solid the movable frames A are run onto the movable platforms B, which run upon the rails $k\ k$, and are conveyed away to some suitable place, where the ice is removed from them, and they are refilled with water and brought back in the same manner and placed in the building.

Figure 10:
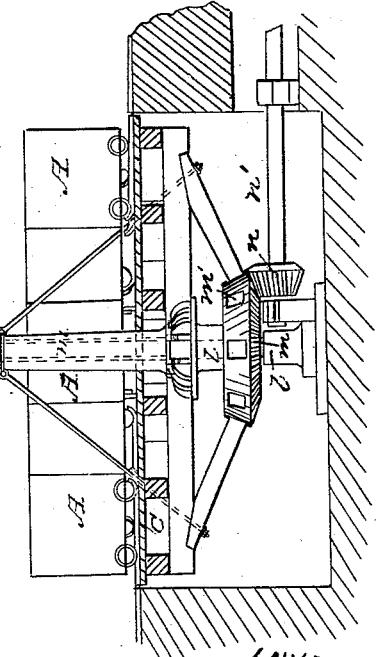

Another mode of causing an artificial current of air to play upon the surfaces of the freezing-vessels is shown at Figs. 10 and 11. This consists in giving motion to the vessels by placing the frames A on a horizontal platform, which is made to revolve rapidly through the air. The effect of the velocity of the vessels through the air is the same as when the air passes over the vessels. Fig. 10 is a sectional elevation of this arrangement, and Fig. 11 is a plan view thereof. A A are the frames, containing a number of freezing pans or vessels, such as those shown at Fig. 3. These frames are placed upon the horizontal platform $c$, which is suspended on a central spindle, $l$, by a socket, $m$, which carries a bevel-wheel, $m'$, whereby motion is communicated thereto from the bevel-wheel $n$ on the shaft $n'$, which is driven by any first mover. This rotating platform should be placed level with the ground or the floor of the building, so that the frames A can be run off therefrom onto rails, and thus removed to any convenient place for emptying and refilling the vessels. Fig. 12 is an elevation of another arrangement for giving motion to the vessels and frames. In this instance the frames are suspended from centers, and are rotated in a vertical plane by motive power applied in any suitable way to the axle D of the large rotating frame C.

When the operations are to be carried on for commercial purposes the sides of the buildings should be of boards, and the covering may be of canvas, or it may be made of lower boards, as shown in Fig. 9.

The boards at the sides can be raised at any time when the thermometer is 32° Fahrenheit or below, and the same rule will apply for the covering-boards; but whenever it is above this they should be closed, in order that the effect of the sun's rays or light may not raise the temperature of the water and of the apparatus.

We prefer to make the freezing pans or vessels of sheet or cast iron, and it will be found best to have their outer surface finely striated or covered with some black pigment to make a good radiating-surface for the caloric to pass off freely.

The form and size of the pans can be varied at will, to suit the climate and the demands of the market, as it will be obvious that for very cold climates the pans, if desired, can be made of much larger size than in climates in which the temperature descends but little below the freezing-point.

We have also contemplated the application of our said invention by attaching a series of freezing pans or vessels by their rims to the bottom of a large horizontal frame, the bottom of which is made of open-work to correspond with the said pans. This frame is provided with trunnions at the ends, mounted to turn in suitable boxes in standards. The upper surface of this frame constitutes a shallow vat, to receive the water to fill the series of freezing-pans in the bottom thereof. After the water in the freezing-pans has been frozen solid the frame can be turned over to discharge the blocks of ice onto the floor below, which may be inclined, that they may slide down to the ice-house; but other means may be employed for removing them.

What we claim as our invention, and desire to secure by Letters Patent for obtaining solid blocks of ice of uniform size, is—

1. Exposing water in a series of pans or vessels made of some good conductor of caloric, and suspended by their rims so as to expose their outer surfaces to the action of the atmosphere, substantially as described.

2. Combining with the series of freezing-pans the means, substantially as herein described, for causing a more energetic action of the air on the surface of the said pans, as described.

CHAS. M. KELLER.
JAMES HENDERSON.

Witnesses:
WM. H. BISHOP,
A. DE LACEY.